United States Patent
Kadota

(10) Patent No.: US 8,411,291 B2
(45) Date of Patent: Apr. 2, 2013

(54) IMAGE PROCESSING PROGRAM PRODUCT

(75) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1195 days.

(21) Appl. No.: 11/580,073

(22) Filed: Oct. 13, 2006

(65) Prior Publication Data

US 2007/0086023 A1    Apr. 19, 2007

(30) Foreign Application Priority Data

Oct. 13, 2005   (JP) ................................. 2005-298599
Oct. 13, 2005   (JP) ................................. 2005-298614
Oct. 13, 2005   (JP) ................................. 2005-298623

(51) Int. Cl.
 *G06F 3/12*      (2006.01)
 *H04N 1/00*      (2006.01)
 *H04N 1/32*      (2006.01)

(52) U.S. Cl. ...... 358/1.13; 358/1.15; 358/400; 358/403; 358/404; 358/442

(58) Field of Classification Search ................. 358/1.13, 358/1.15
See application file for complete search history.

(56) References Cited

U.S. PATENT DOCUMENTS

| | | | | |
|---|---|---|---|---|
| 5,267,047 | A * | 11/1993 | Argenta et al. | 358/400 |
| 6,671,063 | B1 * | 12/2003 | Iida | 358/1.15 |
| 2001/0043352 | A1 * | 11/2001 | Brossman et al. | 358/1.13 |
| 2002/0054323 | A1 * | 5/2002 | Yamada et al. | 358/1.15 |
| 2002/0138564 | A1 | 9/2002 | Treptow et al. | |
| 2003/0030846 | A1 | 2/2003 | Mori et al. | |
| 2003/0078965 | A1 | 4/2003 | Cocotis et al. | |
| 2003/0079030 | A1 | 4/2003 | Cocotis et al. | |
| 2003/0182378 | A1 | 9/2003 | Treptow et al. | |
| 2004/0051912 | A1 * | 3/2004 | Schlank et al. | 358/468 |
| 2005/0015428 | A1 * | 1/2005 | Ferlitsch | 709/200 |

FOREIGN PATENT DOCUMENTS

| | | |
|---|---|---|
| JP | 11-150614 | 6/1999 |
| JP | 2000-196801 | 7/2000 |
| JP | 2001-154961 | 6/2001 |
| JP | 2001-358860 | 12/2001 |
| JP | 2003-032404 | 1/2003 |
| JP | 2003-189075 | 7/2003 |
| JP | 2004-220134 | 8/2004 |
| JP | 2005-026774 | 1/2005 |
| JP | 2005-523489 | 8/2005 |

OTHER PUBLICATIONS

U.S. Appl. No. 11/565,122, filed Nov. 30, 2006, to Masatoshi Kadota, first named inventor.
Notification of Reasons for Refusal Application No. 2005-298599 mailed on Apr. 20, 2010.
Notice of Reason for Refusal in corresponding Japanese Application 2005-298623, mailed Jul. 6, 2010.

* cited by examiner

*Primary Examiner* — King Poon
*Assistant Examiner* — Vincent Peren
(74) *Attorney, Agent, or Firm* — Banner & Witcoff, Ltd.

(57) ABSTRACT

An image processing program product enables an image processing apparatus to perform operations including the steps of: storing a plurality of image information to be transmitted by a facsimile apparatus; sequentially outputting the stored image information; reading a mode list from a mode list recording unit on which a list of modes for images to be transmitted has been described; converting an image in accordance with the mode indicated by the mode list; and transmitting the converted image information to the facsimile apparatus. The converting includes a transmission data forming step for adding a transmission destination described in the mode list recording unit to the outputted image information and for forming transmission data based upon the mode of the image described in the mode list recording unit.

13 Claims, 13 Drawing Sheets

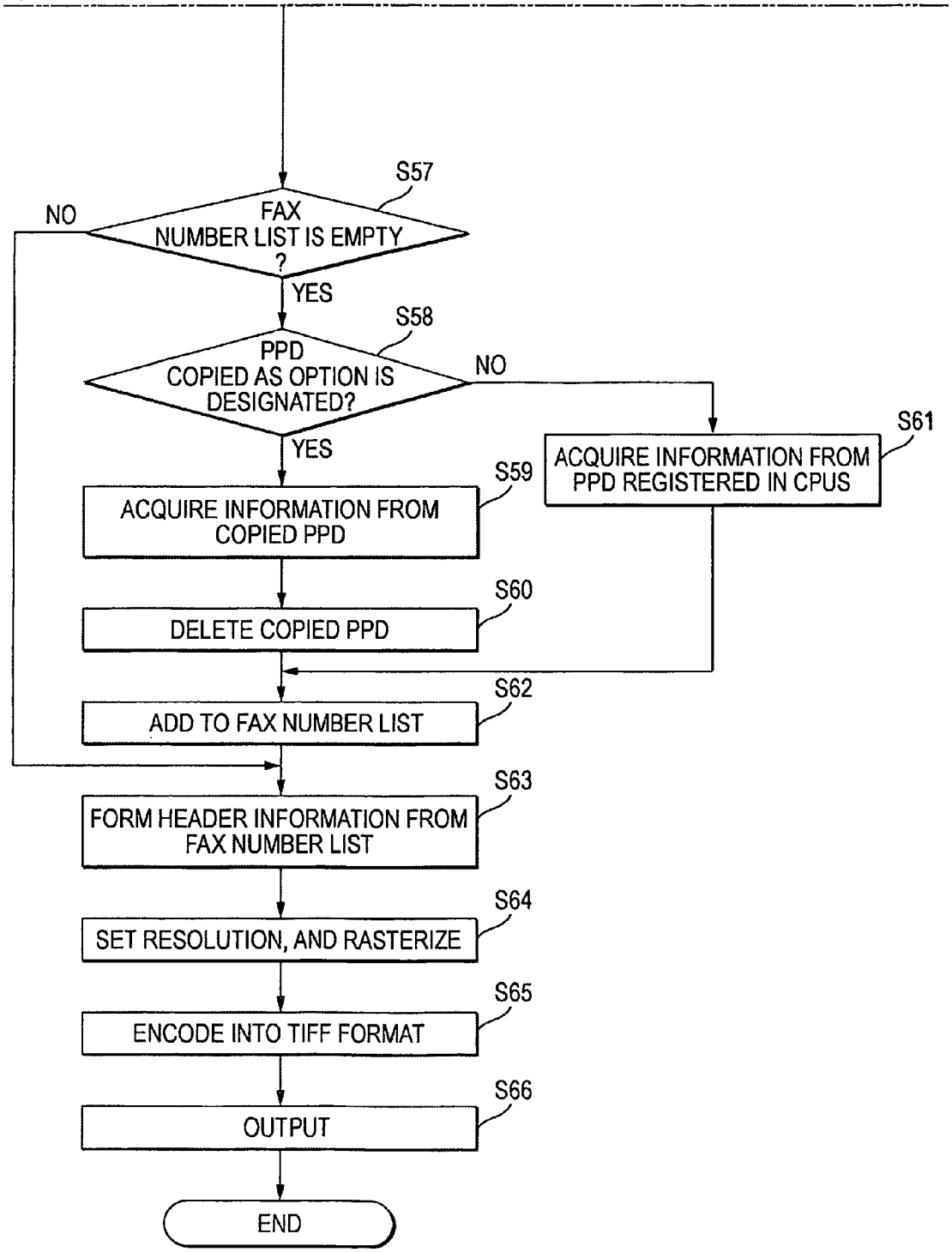

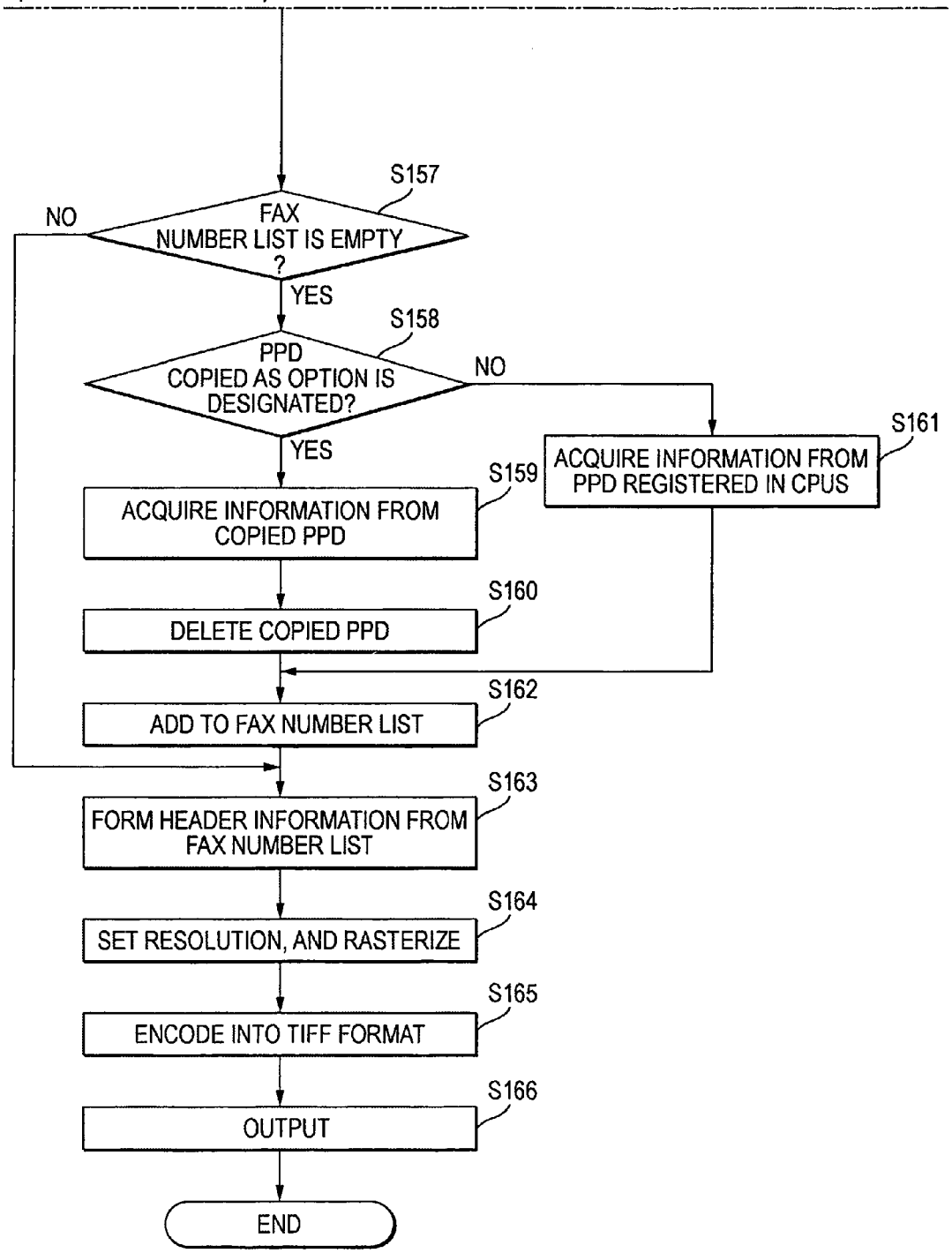

IMAGE PROCESSING PROGRAM PRODUCT

CROSS REFERENCE TO RELATED APPLICATION

This application claims priority from Japanese Patent Applications No. 2005-298599, 2005-298614 and 2005-298623, filed on Oct. 13, 2005, the entire subject matters of which are incorporated herein by reference.

TECHNICAL FIELD

Aspects of the present invention relate to an image processing program which is executed in an image processing apparatus for performing a processing operation of image information to be transmitted by a facsimile apparatus.

BACKGROUND

An image processing apparatus for transmitting image information by facsimile apparatus while utilizing a computer is known. JP-A-2003-189075 discloses such a facsimile apparatus which receives both image information to be transmitted and information of a transmission destination via a network, and transmits the received image information to the received transmission destination.

However, in such a case that image information to be transmitted to the facsimile apparatus and a transmission destination of the above-mentioned image information are designated by operating a computer which uses such an OS (Operating System) as UNIX (registered trademark) series, there is no way other than such a method that both this image information and the transmission designation thereof are described in a command line as an option. Accordingly, if a user does not master the command line, then the user cannot designate the transmission destination.

JP-A-2003-189075 also discloses such a facsimile apparatus which receives a file where a plurality of transmission destinations for a multicast communication purpose have been described, and transmits an image to the transmission destinations described in the received file.

Also, programs for directly transmitting images formed on computers to facsimile apparatus without printing these images on a sheet are known. Normally, these programs transmit data to the facsimile apparatus via such printing systems as CUPS (Common UNIX Printing System) and LPD (Line Printer Daemon).

This sort of printing system contains a function called as a spooler. In the printing system, transmission data transmitted from a plurality of clients in an asynchronous mode are once stored, and are sequentially transmitted to the facsimile apparatus by the above-explained spooler. For instance, in the case where transmission information "A", "B", "C" are transmitted at the substantially same time from a plurality of application programs, the spooler firstly transmits the transmission information "A", and transmits the transmission information "B" after the transmission of the above-described transmission information "A" is ended, and similarly transmits the transmission information "C" after the transmission of the above-described transmission information "B" is ended. In this case, the transmission information "A" is transmitted with substantially no time lag. However, the transmissions of the transmission information "B" and "C" should be waited until the transmission information immediately before the previous transmission information has been transmitted. Normally, this waiting time period is not notified to users. In other words, the users cannot grasp when the transmission information instructed by themselves is processed.

In such a case where the technical idea of JP-A-2003-189075 is applied with respect to the facsimile apparatus using the above-explained spooler, the below-mentioned problems occur. That is, the above-explained spooler can sequentially transmit the plural pieces of transmission data which are instructed to be sent in the asynchronous mode to the facsimile apparatus. Therefore, as explained above, the time lag may be produced after the user instructs the facsimile transmission of the image until this image is actually processed and the processed image is actually transmitted with respect to the facsimile apparatus. However, the file into which the destinations of the multicast communications have been stored is used after the SPOOL process operation by the spooler is accomplished. As a result, if the file is amended, deleted, and/or moved within a time period until this file is used, then the image cannot be transmitted to the correct destination.

When the transmission designation by the user is once accomplished, the user probably has such a misunderstanding feeling that all of the process operations have been accomplished. Then, in the above case, there are some cases where the user may amend the destination list file in order to prepare a subsequent transmission, or may delete this destination list file, or may move the destination list file.

In the case where such a file is amended which indicates a transmission destination of transmission data under stored in the spooler, an actual transmission destination becomes such a destination described in this amended file, namely, the transmission data is transmitted to a transmission destination which is not intended by a sender. Also, in the case where such a file is deleted, or moved which indicates a transmission destination of transmission data under stored in the spooler, an actual transmission destination cannot be found out.

SUMMARY

An aspect of the present invention provides an image processing program which is formed by a simple structure and is capable of designating a transmission destination of image information.

Another aspect of the invention provides an image processing program capable of firmly transmitting image information to an intended transmission destination.

According to an aspect of the invention, there is provided an image processing program product comprising: software instructions for enabling an image processing apparatus mounting thereon a printing system to perform predetermined operations; and a computer readable medium bearing the software instructions; the predetermined operations including the steps of: storing a plurality of image information to be transmitted by a facsimile apparatus; sequentially outputting the stored image information; reading a mode list from a mode list recording unit on which a list of modes for images to be transmitted has been described; converting an image in accordance with the mode indicated by the mode list; and transmitting the converted image information to the facsimile apparatus, wherein the converting comprises a transmission data forming step for adding a transmission destination described in the mode list recording unit to the outputted image information and for forming transmission data based upon the mode of the image described in the mode list recording unit.

According to another aspect of the invention, there is provided an image processing program product comprising: software instructions for enabling an image processing apparatus to perform predetermined operations; and a computer readable medium bearing the software instructions; the predetermined operations including: a storing step for storing a plurality of image information to be transmitted by a facsimile apparatus; an outputting step for sequentially outputting the stored image information; an instructing step for designating a multicast communication list capable of storing a plurality of transmission destinations in correspondence with the image information to be transmitted, and for instructing the transmission of the image information by the facsimile apparatus; a rewrite prohibition setting step for setting a rewriting operation of the multicast communication list which is prohibited when the transmission of the image information is instructed by the instructing step; a transmission data forming step for adding a facsimile number of a transmission destination stored in the multicast communication list to the outputted image information so as to form transmission data; and a transmitting step for transmitting the transmission data formed by the transmission data forming step to the facsimile apparatus.

According to still another aspect of the invention, there is provided an image processing program product comprising: software instructions for enabling an imager processing apparatus to perform predetermined operations; and a computer readable medium bearing the software instructions; the predetermined operations including: a storing step for storing a plurality of image information to be transmitted by a facsimile apparatus; an outputting step for sequentially outputting the stored image information; a multicast communication designating step for designating a multicast communication list capable of storing a plurality of transmission destinations and capable of being rewritten the transmission destinations; a storage step for storing the multicast communication list designated by the multicast communication list designating step as a file which is different from the multicast communication list; a transmission data forming step for adding a facsimile number of a transmission destination stored in the file stored in the storage step to the outputted image information so as to form transmission data; and a transmitting step for transmitting the transmission data formed by the transmission data forming step to the facsimile apparatus.

DETAILED DESCRIPTION

Figure 1:
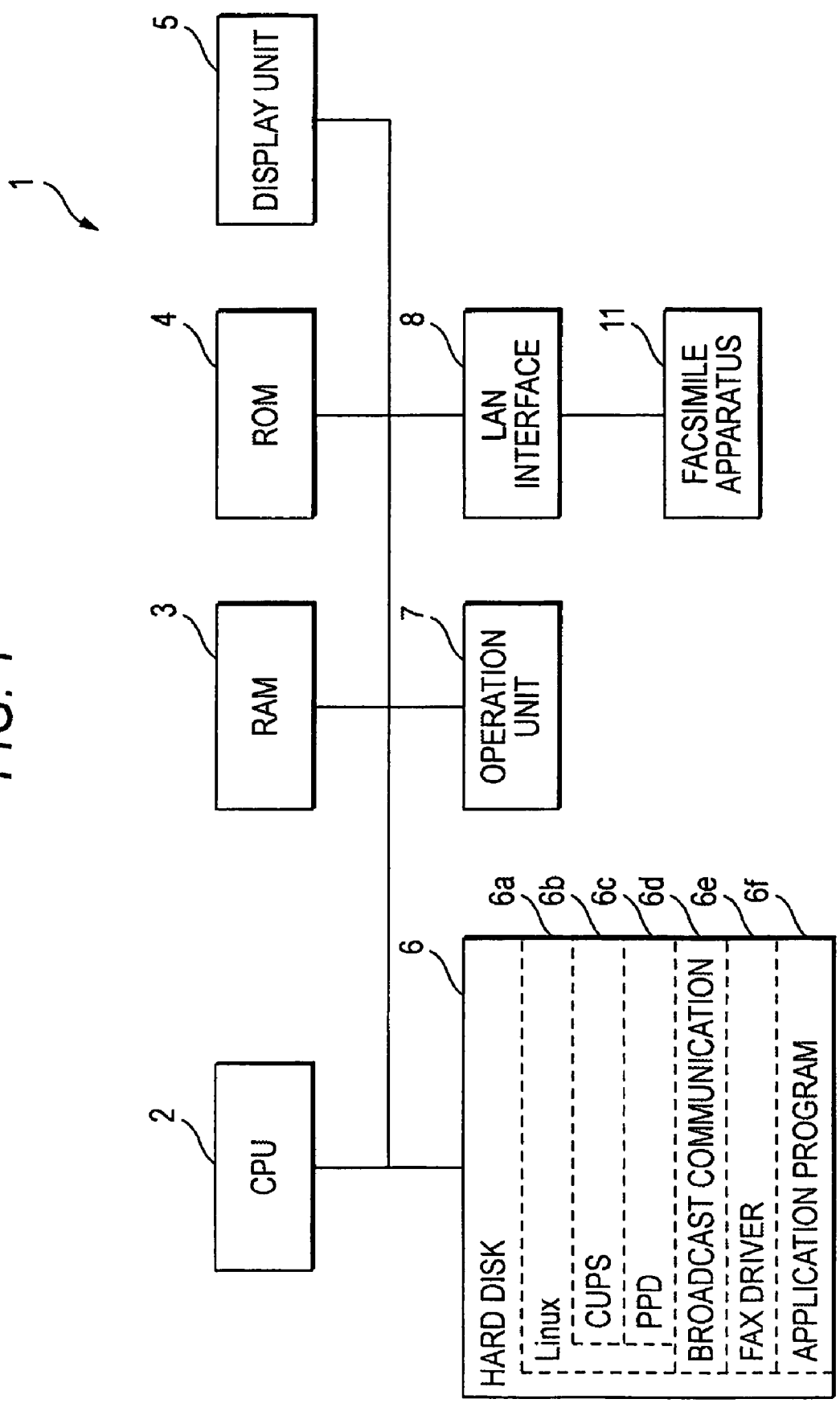
FIG. 1 is a block diagram showing an electric arrangement of a computer according to an aspect of the present invention.

An aspect of the present invention will be now described below with reference to the accompanying drawings. FIG. 1 is a block diagram showing an electric arrangement of a computer 1, and a facsimile apparatus 11 connected thereto via a LAN (Local Area Network). The computer 1 has "Linux (registered trademark)" as an operating system (OS), and is equipped with a CPU 2, a RAM 3, a ROM 4, a display unit 5, a hard disk (HDD) 6, an operation unit 7, and a LAN interface 8, which are connected to one another via buses.

The CPU 2 is a processor which executes various sorts of programs stored in the ROM 4 and/or the hard disk 6. The RAM 3 is a random access memory having a storage area for storing programs stored in the hard disk 6 when the CPU 2 executes various sorts of programs, and a work area for temporarily storing thereinto variables or the like.

The display unit 5 is a display constructed of, for example, a liquid crystal device. The display unit 5 displays a setting screen where a user sets various values when the CPU 2 executes a program, and images or the like formed based on the set values or the like.

The hard disk 6 is a non-volatile memory having a large memory capacity. The Linux 6a functioning as the OS, a CUPS (Common UNIX Printing System) 6b, a PPD (PostScript Printer Description) 6c, a multicast communication file 6d, a FAX driver 6e, various application programs 6f, etc. are stored in the hard disk 6. The multicast communication file 6d stores thereinto a plurality of transmission destinations to which data are transmitted by the facsimile apparatus 11. The FAX driver 6e has a facsimile capability using the function of the CUPS 6b. Incidentally, "PostScript (registered trademark)" is a page description language.

The CUPS 6b is a printing system which is controlled by UNIX (registered trademark) based OS, and is configured by a basic control program so as to perform printing operations with printers provided by various printer companies. Process operations to be executed by the CUPS 6b contain a process operation of executing a command line constituted by an instruction and an option, a process operation which is executed based on parameters entered from a GUI (Graphic User Interface), and a SPOOL process operation of storing print information to be printed or data to be facsimiled (FAX transmission data) and outputting the print information or FAX transmission data piece after piece.

The PPD 6c describes an option, a function, etc. of a printer, and is provided by a printer maker for each printer.

The multicast communication file 6d is a text file for storing multiple pieces of transmission destination information, and is prepared as needed by a user. While the multicast communication file 6d can be prepared using a special program, the file 6d can be directly prepared using a text editor or so. The user prepares this file 6d for each group of customers, friends or the like to whom often same image information is transmitted at the same time.

The FAX driver 6e forms transmission information to be transmitted when the transmission information is to be transmitted in a facsimile mode by the facsimile apparatus 11. The FAX driver 6e has a front-end process operation and a back-end process operation which carry out image processing operations using the CUPS 6b.

The application programs 6f are various programs to be executed by the computer 1, and correspond to software such as an editor of forming texts and/or figures and tables.

The operation unit 7 is equipped with a keyboard and a mouse. The keyboard has a plurality of keys corresponding to alphabets, numerals, symbols and the like to input characters and symbols. With the mouse, the user can set a cursor displayed on the display unit 5 to any position, and can click a displayed icon.

The LAN interface 8 interfaces communications with peripheral appliances, other computers and/or a server via LAN cables or over a wireless LAN. Through the LAN interface 8, transmission information can be transmitted to the facsimile apparatus 11 from the computer 1 connected thereto, and reception information received by the facsimile apparatus 11 is transmitted to the computer 1 from the facsimile apparatus 11.

The facsimile apparatus 11 owns both a facsimile capability of transmitting image information received from the computer 1 to a transmission destination designated by the computer 1, and also a printer capability of printing image information received from the computer 1.

Figure 2:
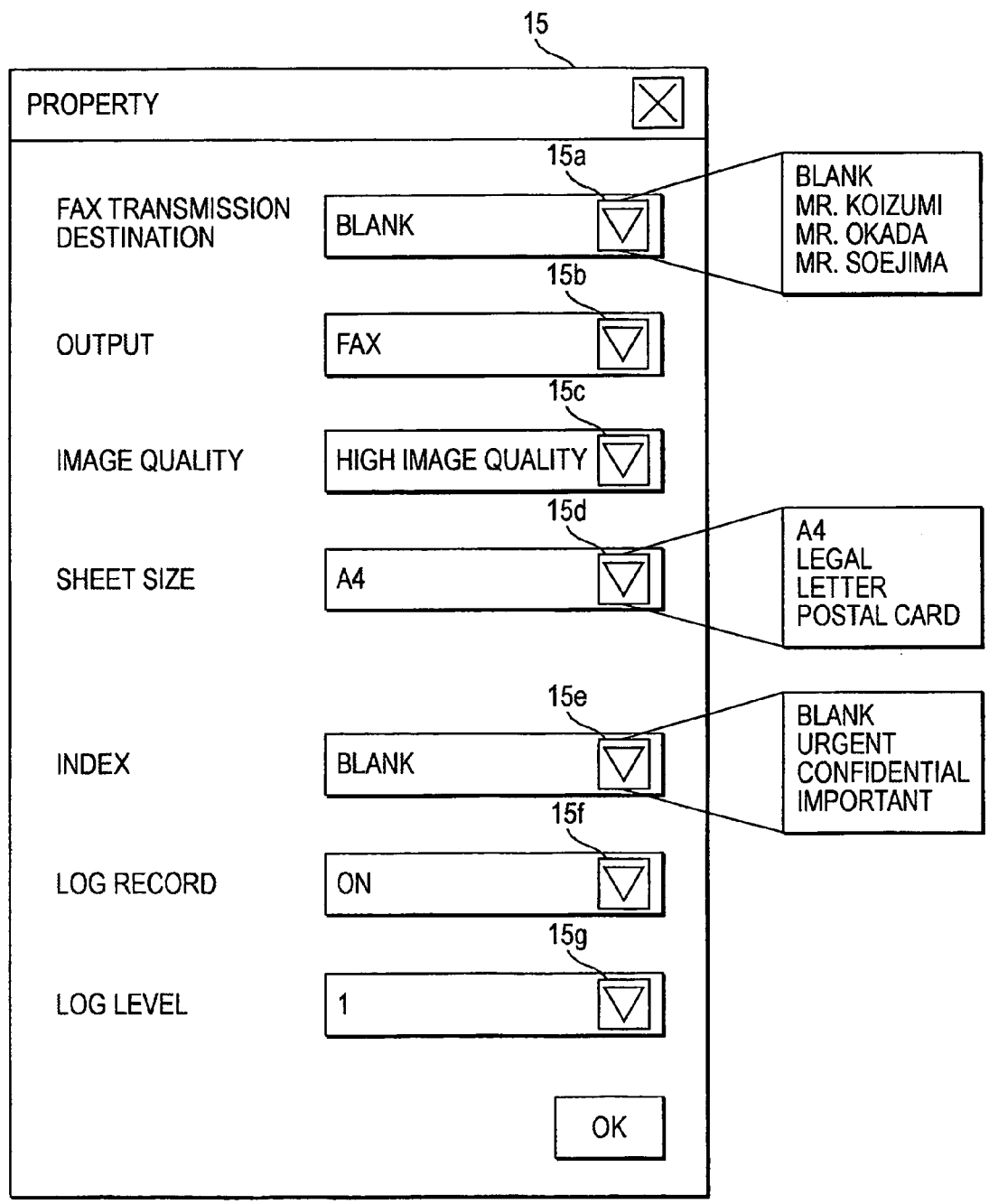
FIG. 2 is a diagram showing a setting screen displayed in a GUI input process operation by which parameters of PPD are set.
Figure 3:
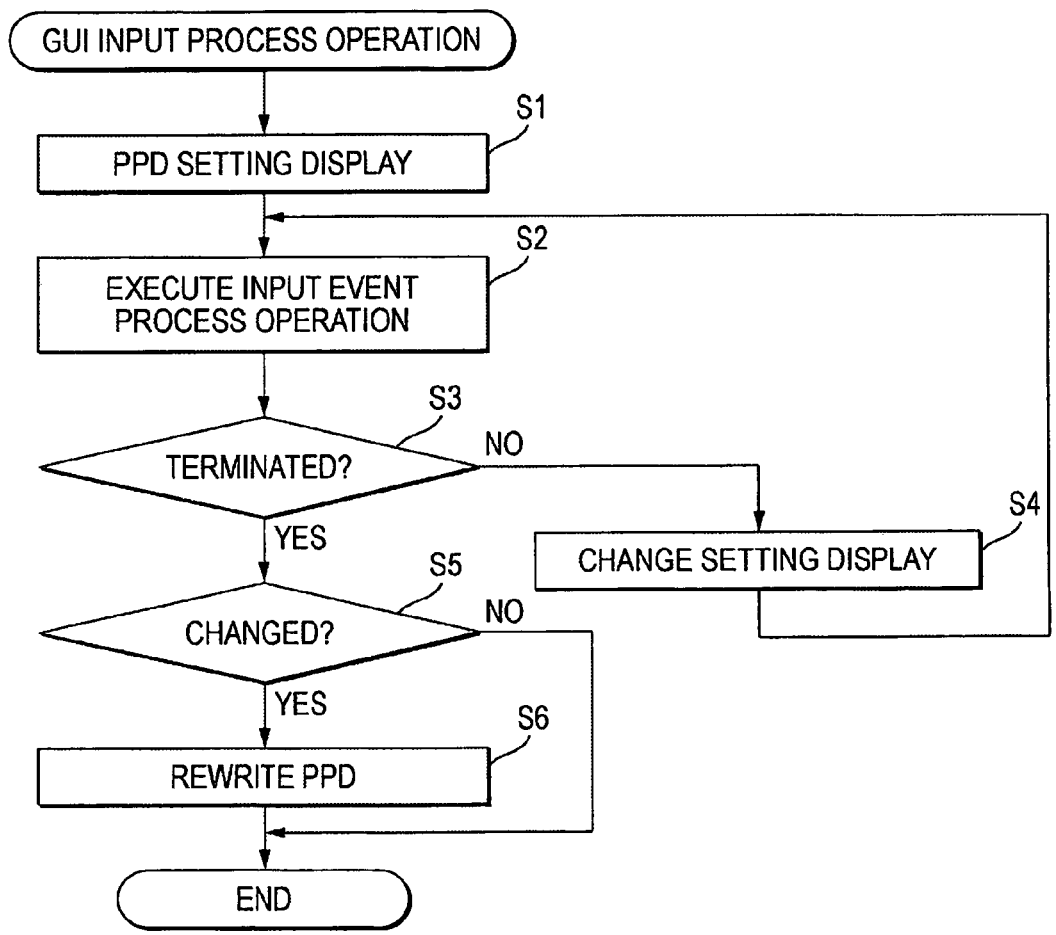
FIG. 3 is a flow chart showing a GUI input process operation.

Referring to FIGS. 2 and 3, a process operation of changing and setting various sorts of parameters in the PPD 6c will be described next. Default settings of various sorts of parameters in facsimile transmission are described in the PPD 6c. The default values can be changed on a browser using the functions of the CUPS system.

FIG. 2 shows a setting screen 15 for various sorts of parameters in the PPD 6c which are displayed on the display unit 5 by the GUI. The setting screen 15 displays a facsimile transmission destination designating box 15a, an output setting box 15b, an image quality setting box 15c, a sheet size setting box 15d, an index setting box 15e, a log storing/setting box 15f, a log level setting box 15g, and an OK button 15h. The facsimile transmission destination designating box 15a designates a transmission destination for facsimile transmission. Whether to transmit image information received from the computer 1 to a transmission destination by facsimile or print the image information with a printer is set in the output setting box 15b. Through the image quality setting box 15c, the user sets the image quality at the time of printing or performing facsimile transmission to either high quality or normal quality. With the sheet size setting box 15d, the user sets the size of a recording sheet for image information to be printed or transmitted by facsimile. With the index setting box 15e, the user sets an index to be printed as an index for image information to be printed or transmitted by facsimile. With the log storing/setting box 15f, the user sets whether or not to store a log in facsimile transmission. With the log level setting box 15g, the user sets a log level when storing a log. The OK button 15h designates the end of setting operation.

An icon is displayed to the right of each box (displayed as downward triangle in square) so as to instruct the display of a pull-down menu. Clicking the icon with the mouse displays the pull-down menu. In the case of a transmission destination, for example, a blank which is displayed in printing operation, the name of an individual (e.g., Mr. Koizumi), and so forth are displayed. With regard to the sheet size, "A4", "legal", "letter", "postal card", and so forth are displayed. Moving the cursor with the mouse, the user can select any one of the displayed candidates. The selected parameter is displayed in each box.

The log levels which are set in the log level setting box 15g contain a log level 1 and a log level 2. When the log level 1 is set, a log including the date of transmission from the facsimile apparatus 11 and a transmission destination is stored in a transmission log file, and transmitted transmission data is not stored. When the log level 2 is set, a log including the date of transmission from the facsimile apparatus 11 and a transmission destination is stored in a transmission log file, and transmitted transmission data is also stored.

Next, a GUI input process operation will be explained referring to FIG. 3. FIG. 3 is a flow chart for illustrating the GUI input process operation for setting parameters in the PPD 6c. The flow operation is executed by a program provided by the CUPS 6b as a printing system. First, the setting screen 15 for the PPD 6c is displayed (S1). This setting screen 15 is shown in FIG. 2. Next, a process operation according to an event input through the setting screen 15 is performed (S2). When displaying of a pull-down menu is instructed, for example, the pull-down menu is displayed. When a parameter is selected or designated, this parameter is temporarily stored.

Next, the CPU 2 determines as to whether the input event instructs the end of setting operation or not (S3). Events for instructing the end of setting operation include depression of an enter key on the keyboard and clicking of the OK button 15h with the mouse on the setting screen 15 shown in FIG. 2. When the input event does not instruct the end of setting operation (S3: No), the CPU 2 changes the display of the setting screen 15 according to the event (S4), and returns to the process operation of S2. When the input event instructs the end of setting operation (S3: Yes), the CPU 2 determines as to whether any parameter has been changed or not (S5). When some parameter has been changed (S5: Yes), the CPU 2 rewrites the PPD 6c (S6). When no parameter has been changed (S5: No), the CPU 2 terminates the GUI input process operation without rewriting the PPD 6c. This process operation can allow the user to select a FAX transmission destination with the same feeling obtained for selection of the ordinary print mode, such as changing the sheet size done conventionally.

Figure 4:
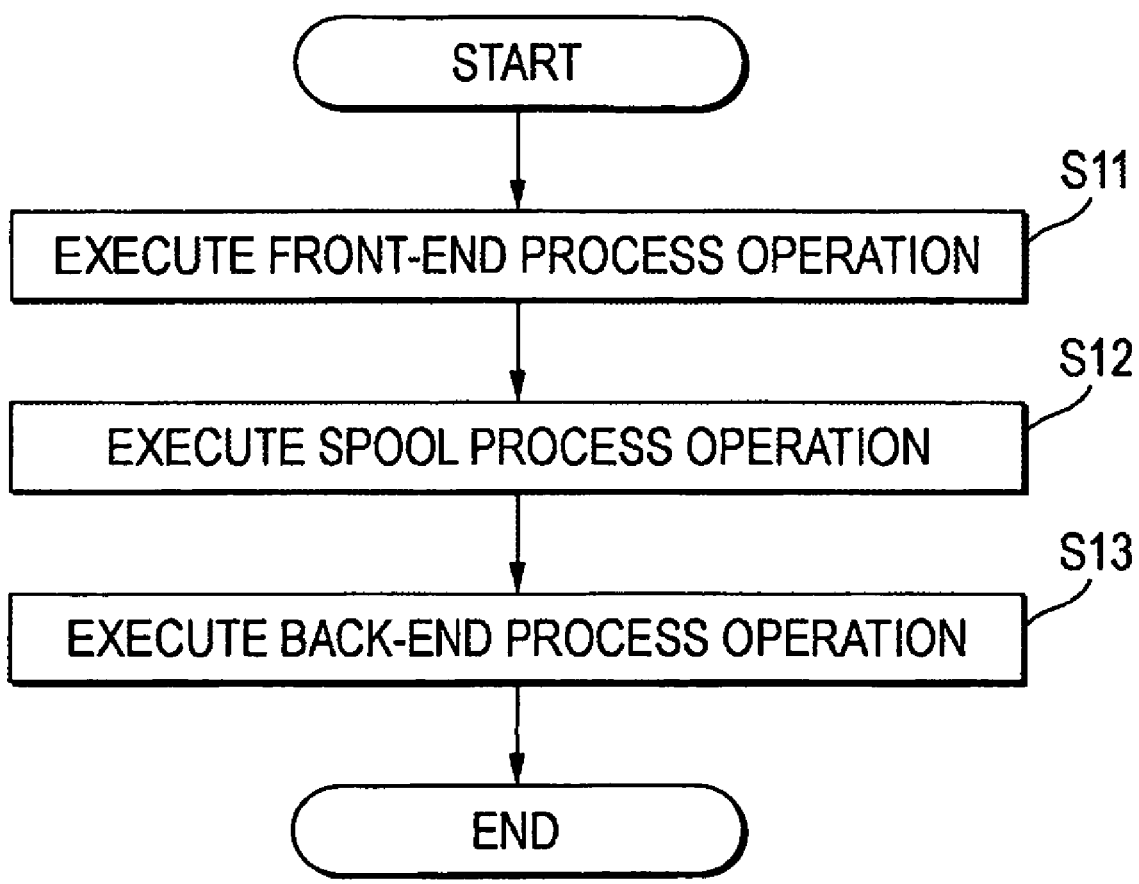
FIG. 4 is a flow chart showing a summary of a facsimile transmitting process operation.

A facsimile transmission process operation which is executed by the computer 1 will now be explained referring to FIG. 4. FIG. 4 is a flow chart for illustrating the facsimile transmission process operation. First, the CPU 2 performs the front-end process operation (S11). The front-end process operation, which will be discussed later referring to FIGS. 5, 6 and 7, allows the user to input a transmission destination at the time of facsimile transmission. It is so assumed that at the time when the front-end process operation is initiated, image information to be transmitted has already been designated.

Image information to be transmitted is stored in the SPOOL file piece after piece in a PostScript form. The information stored in the SPOOL file is converted piece by piece to a data format that can be interpreted by the facsimile apparatus 11, and is transmitted to the facsimile apparatus 11 from the computer 1. The process operation will be elaborated below. The computer 1 detects if the facsimile apparatus 11 is ready for data reception. When the facsimile apparatus 11 is in a receivable state, the computer 1 performs the SPOOL process of transmitting transmission information or print information stored in the SPOOL file (S12).

Next, the back-end process operation of sending image information output from the SPOOL file to the facsimile apparatus 11 is executed (S13). The back-end process operation will be described later referring to FIG. 8. The front-end process operation in S11 and the back-end process operation in S13 are the programs that are supplied from a facsimile maker by the FAX driver 6e.

Figure 5:
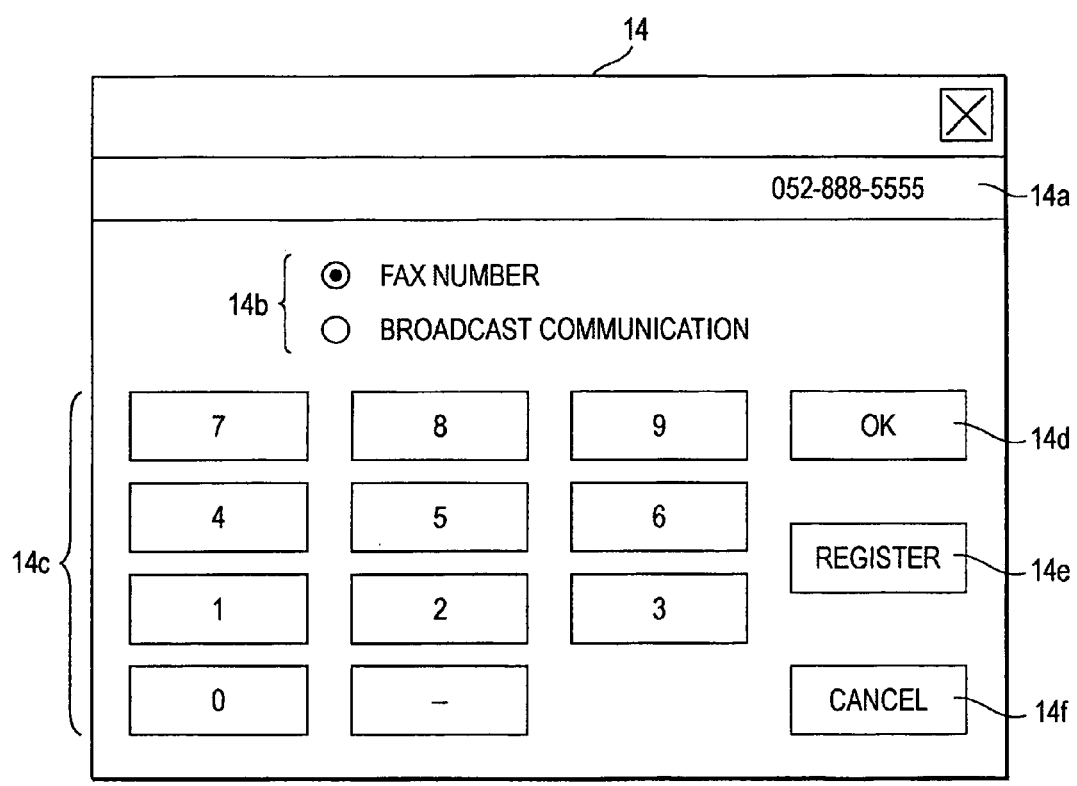
FIG. 5 is a diagram showing a display screen in process operations of a destination setting program.
Figure 6:
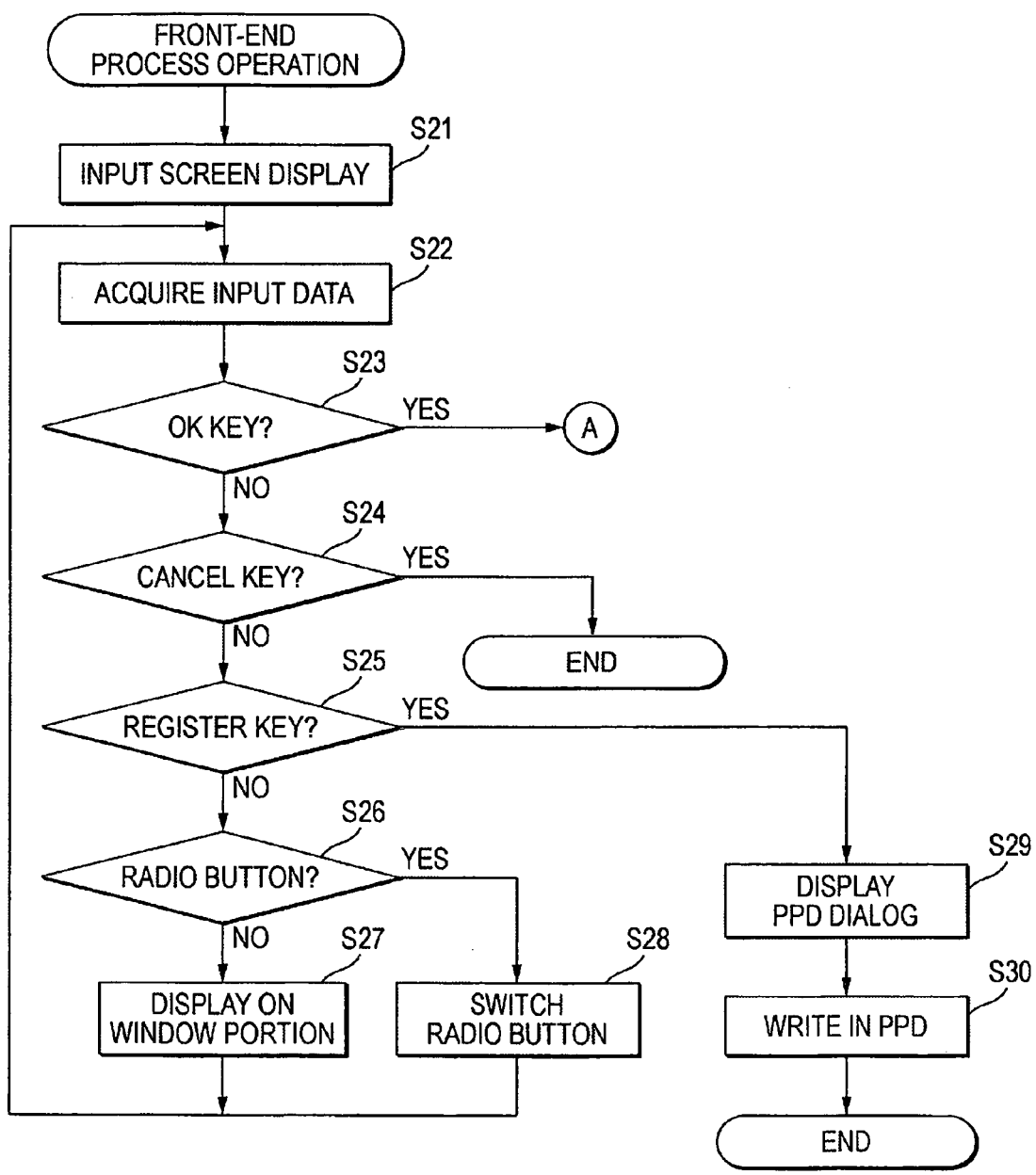
FIG. 6 is a flow chart showing process operations of a destination setting program.
Figure 7:
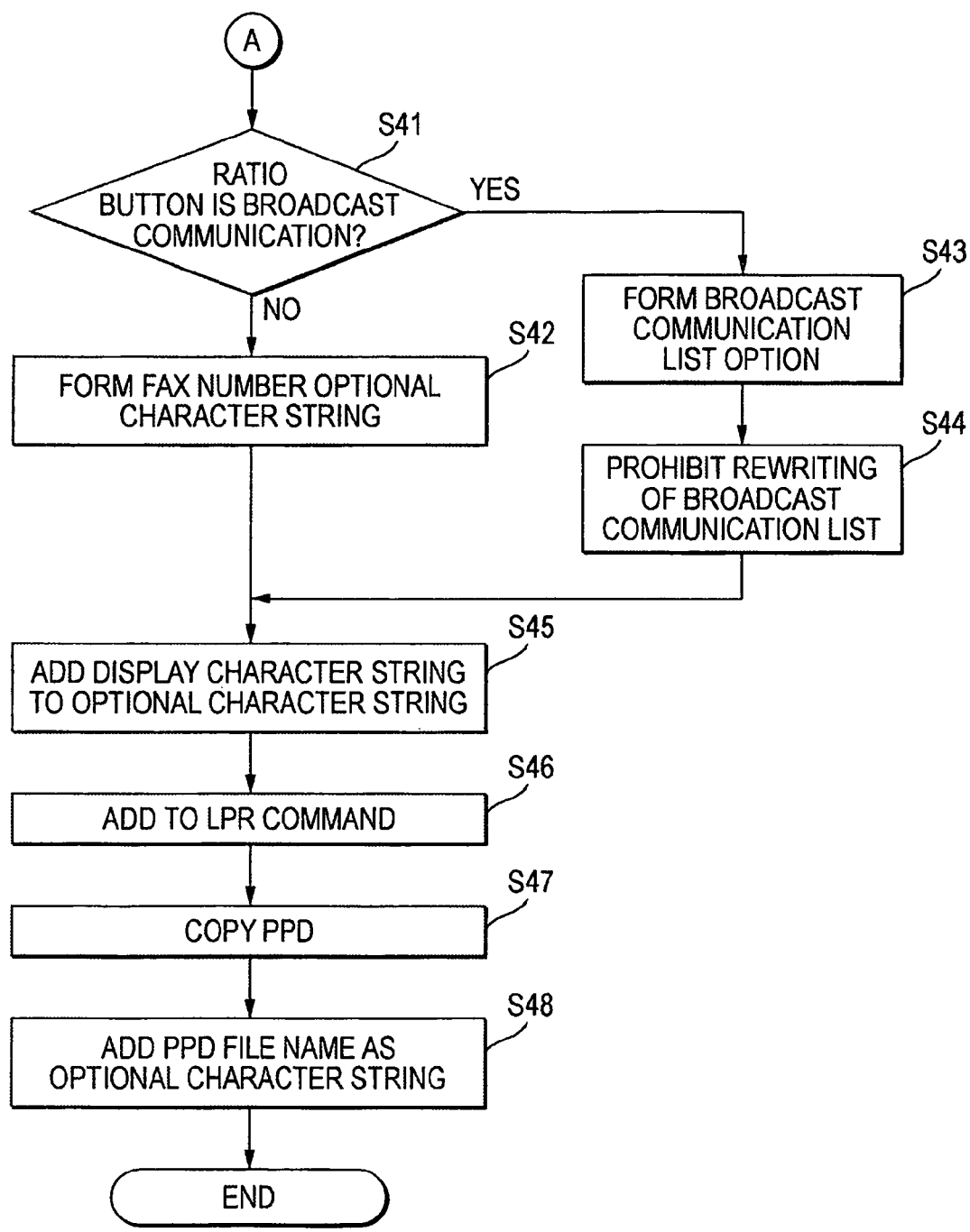
FIG. 7 is a flow chart showing process operations in a case where an OK key is manipulated.

Referring now to FIGS. 5, 6 and 7, the front-end process operation of inputting a transmission destination will be described. FIG. 5 shows an input screen 14 to be displayed on the display unit 5 when the front-end process operation is initiated. The input screen 14 displays a transmission destination display window 14a, a radio button 14b, ten keys 14c, an OK key 14d, a register key 14e and a cancel key 14f. The transmission destination display window 14a displays a file for describing a facsimile number or a transmission destination input, and a multicast communication list when a multicast communication is carried out. The radio button 14b designates which one of a facsimile number and a multicast communication list is to be inputted. The ten keys 14c serve to enter numerals from "0" to "9" and a hyphen.

The radio button 14b can be selected by moving the cursor to one of the two circular windows and by clicking the selected window with the mouse. The function of each of the ten keys 14c, the OK key 14d, the register key 14e and the cancel key 14f can be set by moving the cursor to a desired key and by clicking the selected key with the mouse. The OK key 14d is for indicating the end of the input of the transmission destination. When the OK key 14d is operated, transmission data to be transmitted is stored in the SPOOL file. An image to be stored in the SPOOL file is stored in a PostScript form.

The register key 14e instructs writing of various sorts of parameters in the PPD 6c. When the register key 14e is operated, the inputted facsimile number is registered in the PPD 6c. When a multicast communication is designated by the radio button 14b, the operation of the register key 14e is ignored. The cancel key 14f instructs termination of the input process operation.

When a facsimile number is entered, "FAX number" of the radio button 14b is designated and the facsimile number is inputted using the ten keys 14c or ten keys provided on the keyboard of the operation unit 7. When a multicast communication is entered, "multicast communication" of the radio button 14b is designated and a file name for constituting the multicast communication list is entered using the ten keys provided on the keyboard.

FIGS. 6 and 7 are flow charts for illustrating the process operation of a destination setting program. As the destination setting program is initiated with a PostScript file as an argument, the front-end process operation works as a front end so as to pass the PostScript file to the LPR command. In this case, the destination setting program produces an option command for indicating the destination, and passes the option command to the LPR command at the same time. The destination setting program can be initiated on stand alone. In this case, a process operation of simply inputting a destination and writing the destination to the PPD 6c is performed.

In the process operation shown in FIG. 6, an input screen 14 shown in FIG. 5 is displayed (S21). Then, input data on the display screen 14 or through the keyboard is acquired (S22). Next, the CPU 2 determines as to whether the acquired input data is the OK key 14d or not (S23).

When the acquired input data is originated from the OK key 14d (S23: Yes), the flow operation is advanced to a process operation shown in FIG. 7. When the acquired input data is not originated from the OK key 14d (S23: No), the CPU 2 determines as to whether the acquired input data is originated from the cancel key 14f or not (S24). When the acquired input data is originated from the cancel key 14f (S24: Yes), the CPU 2 terminates the front-end process operation. When the acquired input data is not originated from the cancel key 14f (S24: No), the CPU 2 determines as to whether the acquired input data is originated from the register key 14e or not (S25). When the acquired input data is originated from the register key 14e (S25: Yes), the CPU 2 performs a process operation of storing information for indicating transmission destinations that have been entered so far in the PPD 6c.

In this process operation, first, a dialog screen for designating the PPD 6c is displayed (S29). A user selects the PPD 6c to be rewritten. Next, transmission destination data, input through a sequence of process operations to be described later, is written in the selected PPD 6c (S30). This process operation displays the transmission destination data in a "FAX transmission destination" menu on the GUI screen shown in FIG. 2, permitting the user to select a transmission destination by the operation shown in FIG. 3. While the register key 14e is often used when the program is initiated mainly on stand alone, the register key 14e can also be used when the program is initiated as a front end. With multicast communication being selected by the radio button 14b, the operation of the register key 14e is ignored and the flow operation is advanced to a process operation of S26.

When the acquired input data is not originated from the register key 14e (S25: No), the CPU 2 determines as to whether the acquired input data instructs switching of the radio button 14b (S26). When the acquired input data instructs switching of the radio button 14b (S26: Yes), the CPU 2 changes the radio button 14b. When the input data does not instruct switching of the radio button 14b (S26: No), which implies that the acquired input data is numerical data or character data, data is displayed in the transmission destination display window 14a (S27). When the process operation of S27 or S28 is terminated, the flow operation returns to the process operation of S22.

Referring now to FIG. 7, a description will be made of the process operation when the acquired input data is originated from the OK key 14d. FIG. 7 is a flow chart for illustrating the process operation which is executed when the OK key 14d is operated. First, the CPU 2 determines as to whether the radio button 14b is set to a multicast communication or not (S41). When the radio button 14b is not set to the multicast communication (S41: No), the facsimile number of the transmission destination is displayed in the transmission destination display window 14a, so that an optional command character string for indicating that a subsequent character string is a facsimile number (e.g., "FAXNUMBER=") is produced (S42). When the radio button 14b is set to the multicast communication (S41: Yes), a file name describing transmission destinations for multicast communication is displayed in the transmission destination display window 14a. Accordingly, an optional command character string for indicating that a subsequent character string is a facsimile number (e.g., "NUMBERLIST=") is produced (S43), and rewriting of data on the multicast communication list is prohibited (S44). Specifically, the prohibition can be achieved by prohibiting rewriting of the multicast communication list designated as the transmission destination for image information to be transmitted by the function of the OS or the file system, prohibiting initiation of the program which rewrites the multicast communication list, or preventing rewriting of the memory where the designated multicast communication list is to be stored even when the operation of rewriting the multicast communication list is performed. The setting of the rewrite prohibition can prevent the multicast communication list from being rewritten during the SPOOL process or the like, and prevent transmission information from being transmitted to a wrong transmission destination.

When the process operation of S42 or the process operation of S44 is terminated, the character string displayed in the transmission destination display window 14a is added to the optional character string (S45). As a result, an option command for indicating the transmission destination is produced. The optional character string is added to the LPR command (S46), and the PPD 6c is copied into the temporary area in the RAM 3 (S47). Further, the optional character string is produced based on the file name of the copied PPD 6c, and added to the LPR command (S48) after which the front-end process operation is terminated.

The following is the reason for copying the PPD 6c. While the transmission destination and the specifications of a transmission image are set referring to the PPD 6c after the SPOOL process operation, if the PPD 6c is changed during the setting operation, the transmission destination and the specifications of the transmission image differ from each other. Therefore, a copy of the PPD 6c is formed and transmission data is produced based on the transmission destination and the specifications of the transmission image described in the copied PPD 6c.

A facsimile transmission can be carried out without using the transmission setting program. This is mainly used when the facsimile transmission is executed from a terminal which cannot have a graphical user interface. This is achieved as the user directly calls an LPR command from the terminal. At this time, the user can designate a destination by directly designating an option command character string.

When such a destination which has been previously set in the PPD 6c as explained in the present invention is used, an option command for the destination may be alternatively omitted.

Figure 8:
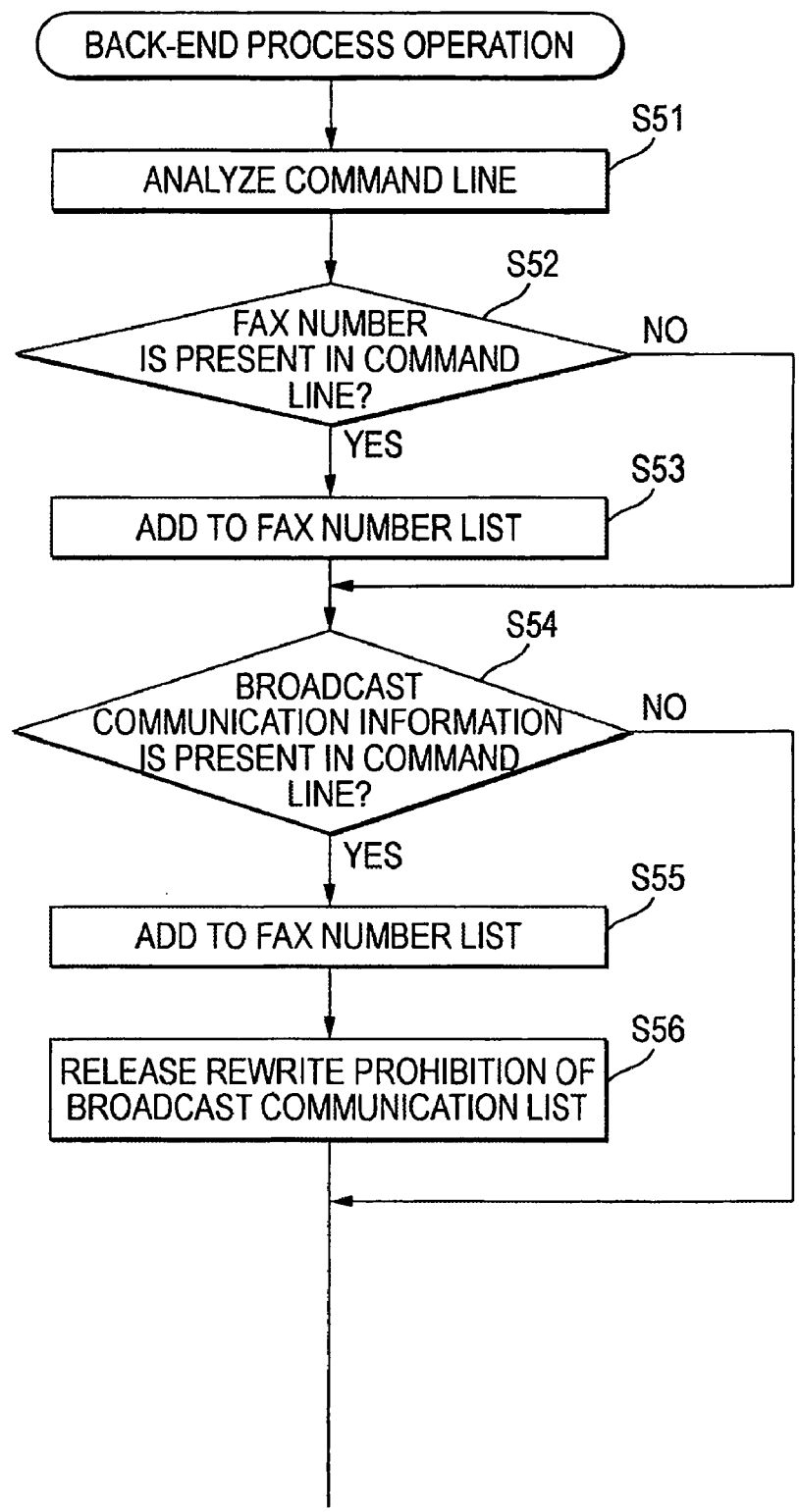
FIG. 8 is a flow chart showing a back-end process operation.

Next, a back-end process operation will be explained referring to FIG. 8. FIG. 8 is a flow chart for illustrating the back-end process operation. In the back-end process operation, first, the CPU 2 analyzes an option in the command line of the LPR command (S51), and determines as to whether the facsimile number of the transmission destination as an option is added to the command line or not (S52).

When the facsimile number of the transmission destination as an option is added to the command line (S52: Yes), the facsimile number is stored in the FAX number list (S53). The FAX number list is a transmission destination list to be stored in, for example, the temporary area in the RAM 3.

When the facsimile number of the transmission destination as an option is not added to the command line (S52: No) or the process operation of S53 is terminated, the CPU 2 then determines as to whether the name of the multicast communication file is added as an option to the command line or not (S54). When the name of the multicast communication file is added to the command line as an option (S54: Yes), the facsimile number stored in the multicast communication list is stored in the FAX number list (S55). Next, prohibition of rewriting the multicast communication list is released (S56). The release can enable rewriting of the multicast communication list so that the multicast communication list can be updated.

When the name of the multicast communication file is not added as an option to the command line in the decision process of S54 (S54: No), or when the process operation of S56 is terminated, the CPU 2 determines as to whether the FAX number list stored in the temporary area is empty or not (S57).

When the FAX number list stored in the temporary area is empty (S57: Yes), the CPU 2 determines as to whether the copied PPD 6c is designated as an option into the command line or not (S58). When the PPD 6c is copied in the front-end process operation of S47, the copied PPD 6c as an option is designated in the command line in S48. When a facsimile transmission is commanded in the command line without using the front-end process operation, no copy is produced.

When the copied PPD 6c is designated as an option (S58: Yes), information is acquired from the copied PPD 6c (S59), and the copied PPD 6c is deleted (S60).

When the copied PPD 6c is not designated as an option in the command line (S58: No), information is acquired from the PPD 6c registered in the CUPS 6b (S61). When the process operation of S60 or S61 is terminated, the facsimile number of the transmission destination acquired from the copied PPD 6c or the PPD 6c registered in the CUPS 6b is added to the FAX number list (S62).

When the FAX number list stored in the temporary area is not empty (S57: No), or when the process operation of S62 is terminated, the CPU 2 produces header information for describing the facsimile number of the transmission destination stored in the FAX number list (S63), and then rasterizes transmission data in the PostScript form, read from the SPOOL file, with the resolution set by the PPD 6c or the like (S64). For example, rasterization is executed with the resolution of, for example, 200×100 dpi when high resolution is designated, and with the resolution of, for example, 100×100 dpi when the normal resolution is designated.

Further, the CPU 2 encodes the transmission data to transmission data of TIFF (Tagged Image File Format) which can be transmitted via facsimile (S65), and transmits the header-information added transmission data to the facsimile apparatus 11 (S66).

As explained above based on the aspect, at the time of performing facsimile transmission, when a transmission destination for transmission from the facsimile apparatus 11 is designated in the PPD 6c, and a transmission is instructed, transmission data is temporarily set in a standby state by the SPOOL process, and after the SPOOL process is terminated, the transmission destination is set by referring to the PPD 6c. This makes it possible to set a transmission destination in the facsimile apparatus 11 without significantly changing the program or forming a new program using the system provided by the conventional CUPS 6b.

If the PPD 6c is rewritten while the transmission process is operation in a standby mode in the SPOOL process, data is transmitted to a transmission destination which is different from the intended transmission destination. Therefore, information described in the PPD 6c is copied in the temporary area in the RAM 3, and the transmission destination is added to such an image information which has been SPOOL-processed and will be transmitted based on the information copied in the temporary area. This makes it possible to set the correct transmission destination.

Also, when the facsimile transmission is instructed at the time of performing the facsimile transmission while designating the multicast communication list, the transmission data is temporarily set in the standby state by the SPOOL process operation, and after the SPOOL process operation is terminated, the transmission destination is set by referring to the multicast communication list. When the multicast communication list is rewritten in the standby state, the transmission data is transmitted to another transmission destination different from the intended transmission destination. When the transmission is instructed, therefore, rewriting of the multicast communication list is prohibited, and after the SPOOL process operation is terminated, another transmission destination is set by referring to the multicast communication list. This makes it possible to prevent rewriting of the multicast communication list during the SPOOL process operation and set the correct transmission destination.

Since the prohibition of rewriting of the multicast communication list is released after the transmission destination is set, the multicast communication list can be updated.

The process operations of S59 to S65 in the flow chart in FIG. 8 correspond to a transmission data forming step. The process operation of S47 in the flow chart in FIG. 7 corresponds to a saving step.

The process operation of S41 in the flow chart in FIG. 7 corresponds to an instruction step. The process operation of S44 in the flow chart in FIG. 7 corresponds to a rewrite-prohibition setting storage step. The process operations of S63 to S65 in the flow chart in FIG. 8 correspond to a transmission data forming step. The process operation of S66 in the flow chart in FIG. 8 corresponds to a transmission step. The process operation of S56 in the flow chart in FIG. 8 corresponds to a rewrite-prohibition releasing step.

Although the aspect of the present invention has been described above, the present invention is not limited to the aspect, and it should be apparent to those skilled in the art that the present invention may be modified and altered in various forms without departing from the spirit or scope of the invention.

For example, in the aspect, the facsimile number of the transmission destination is described in the header of the image information to be transmitted, and is transmitted to the facsimile apparatus 11. The facsimile number may alternatively sent as a file separate from image information.

In the aspect, the multicast communication list is designated in the front-end process operation. However, the multicast communication list, like the name of an individual, may be alternatively designated in the PPD 6c, and the transmission destination may be alternatively added to FAX transmission data based on the multicast communication list designated in the PPD 6c.

For example, as the method for prohibiting the rewriting operation as to the file of the multicast communication list, such a method of opening the file with exclusive writing designated during the prohibition period may be conceived. In the case that such a program to rewrite the multicast communication list is separately provided, the initiation of the program may be stopped, or rewriting of the file is not carried out even when an operation to rewrite the multicast communication list is performed.

The foregoing description of the aspect has been given of such a case that the facsimile numbers of the plurality of transmission destinations stored in the multicast communication list are described in the header of the image information to be transmitted and are sent to the facsimile apparatus 11. However, such facsimile numbers may be alternatively sent as a separate file from the image information.

In the above-described aspect, when rewriting of the multicast communication list is prohibited, the rewrite prohibition is not displayed on the display unit 5. Alternatively, such a message that the list rewriting operation is prohibited may be displayed on the display unit 5, and the like. Furthermore, in this alternative case, when the prohibition of the list rewriting operation is released, such a display operation that the list rewriting operation is prohibited may be stopped.

Another aspect of the invention will now be described with reference to FIGS. 9 to 11.

A front-end process operation of this aspect will now be described referring to FIGS. 9 and 10. FIGS. 9 and 10 are flow charts for illustrating the front-end process operation. As the front-end process operation is initiated with a PostScript file as an argument, the front-end process operation is effected as a front end so as to pass the PostScript file to the LPR command. In this case, the destination setting program produces an optical command for indicating the destination, and passes the optional command to the LPR command at the same time. On the other hand, the destination setting program may be alternatively initiated on stand alone. In this alternative case, a process operation for simply inputting a destination and writing the destination to the PPD 6c is performed.

Figure 9:
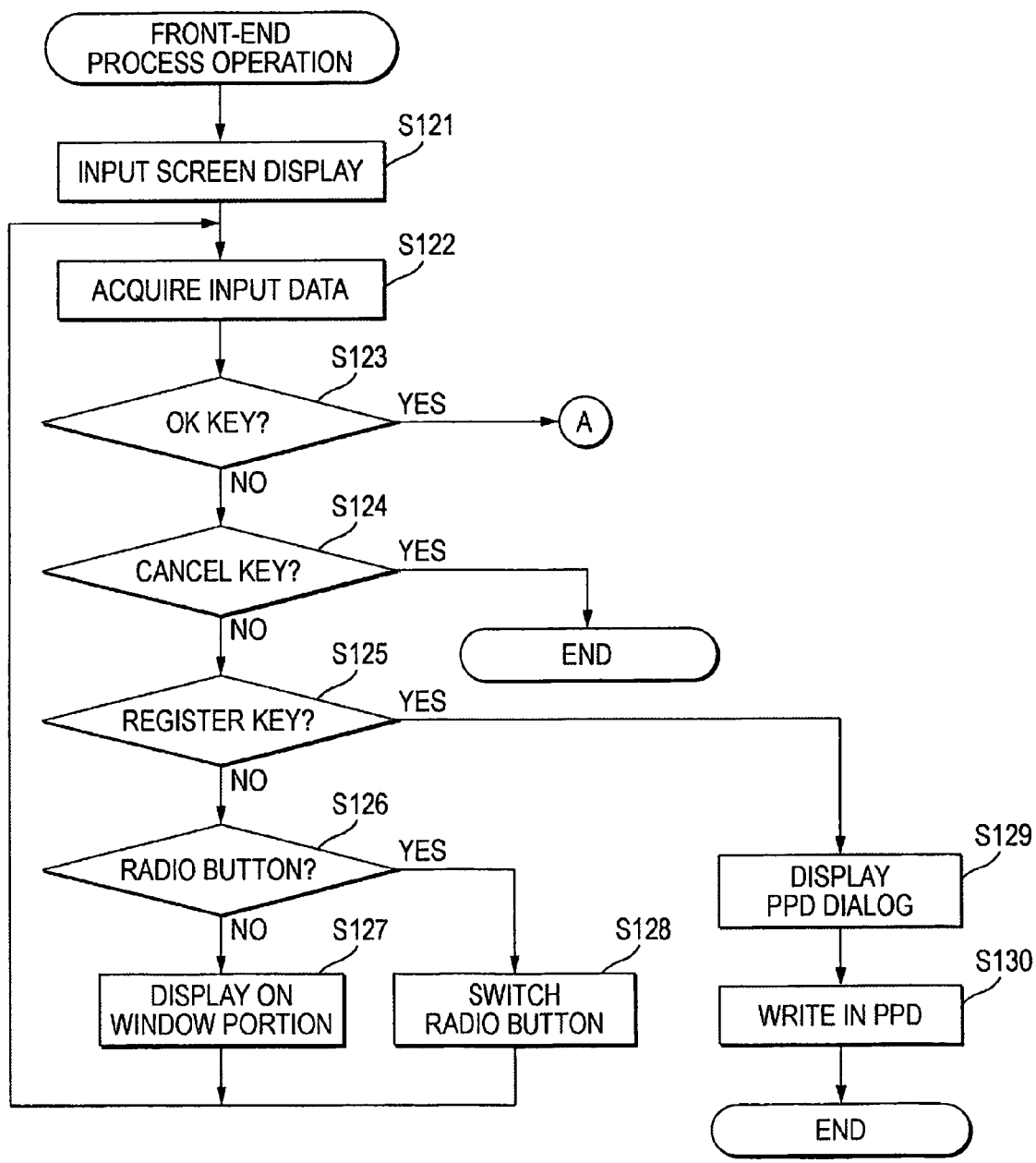
FIG. 9 is a flow chart showing a front-end process operation according to another aspect of the present invention.

In the process operation shown in FIG. 9, an input screen 14 shown in FIG. 5 is displayed (S121). Then, input data on either the display screen 14 or through the keyboard is acquired (S122). Next, the CPU 2 determines as to whether the acquired input data is the OK key 14d or not (S123).

When the acquired input data corresponds to the OK key 14d (S123: Yes), the process operation is advanced to a process operation shown in FIG. 10. When the acquired input data does not correspond to the OK key 14d (S123: No), the CPU 2 determines as to whether the acquired input data corresponds to the cancel key 14f or not (S124). When the acquired input data is corresponds to the cancel key 14f (S124: Yes), the CPU 2 accomplishes the front-end process operation. When the acquired input data does not correspond to the cancel key 14f (S124: No), the CPU 2 determines whether the acquired input data corresponds to the register key 14e or not (S125). When the acquired input data corresponds to the register key 14e (S125: Yes), the CPU 2 performs a process operation of storing information for indicating transmission destinations which have been inputted so far in the PPD 6c.

In this process operation, first, a dialog screen for designating the PPD 6c is displayed (S129). A user selects the PPD 6c to be rewritten. Next, transmission destination data, entered through a sequence of process operations to be described later, is written in the selected PPD 6c (S130). This process operation displays the transmission destination data in a "FAX transmission destination" menu on the GUI screen shown in FIG. 2, permitting the user to select a transmission destination by the operation shown in FIG. 3. While the register key 14e is often used when the program is initiated mainly on stand alone, the register key 14e can also be used when the program is initiated as a front end. When the multicast communication is being selected by the radio button 14b, the operation of the register key 14e is ignored and the process operation is advanced to a process operation of S126.

When the acquired input data does not correspond to the register key 14e (S125: No), the CPU 2 determines as to whether the acquired input data instructs switching of the radio button 14b (S126). When the acquired input data instructs switching of the radio button 14b (S126: Yes), the CPU 2 changes the radio button 14b. When the input data does not instruct switching of the radio button 14b (S126: No), which means that the acquired input data corresponds to numerical data or character data, data is displayed in the transmission destination display window 14a (S127). When the process operation of S127 or S128 is terminated, the process operation returns to the process of S122.

Figure 10:
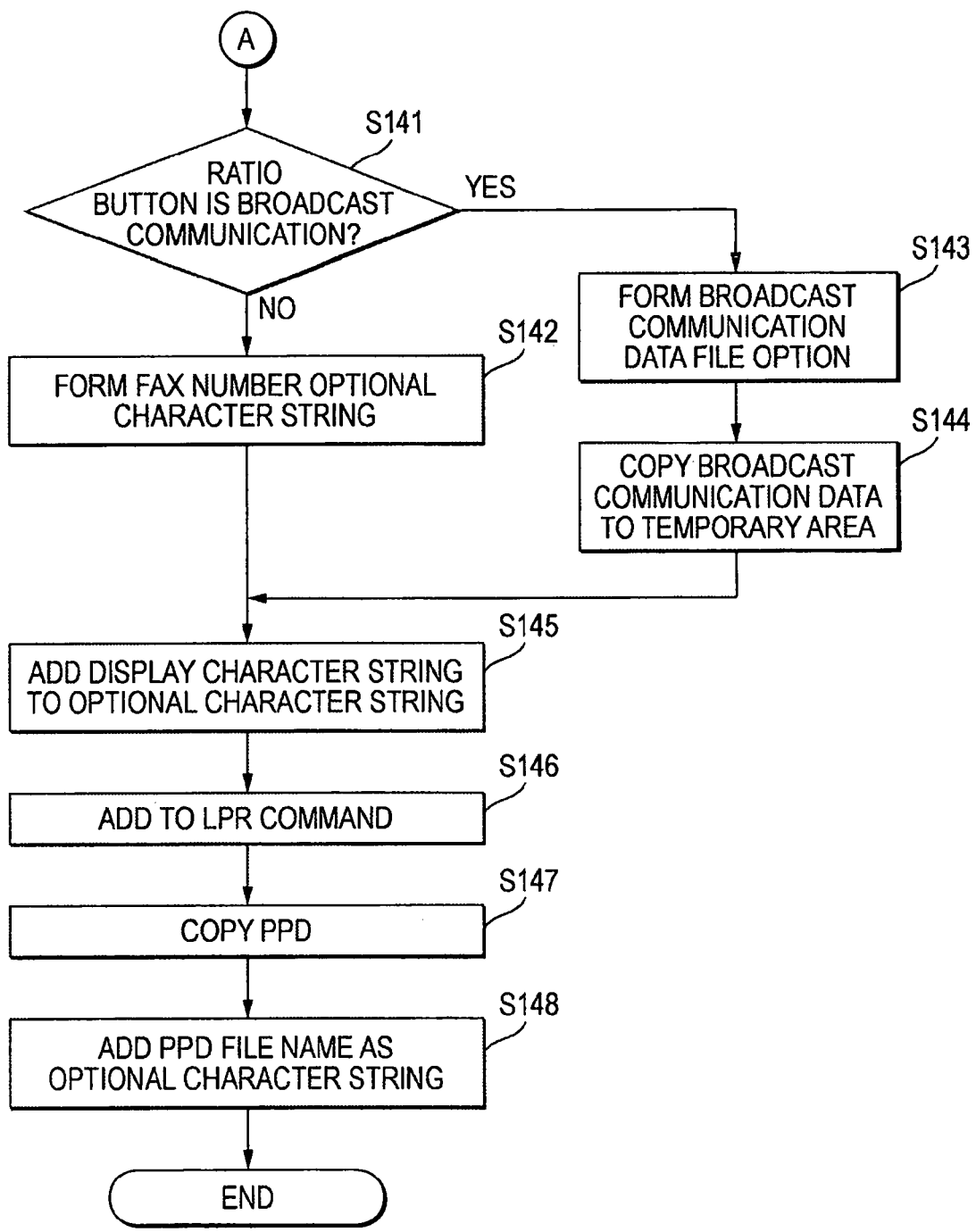
FIG. 10 is a flow chart showing process operations in a case where an OK key is manipulated.
Figure 11:
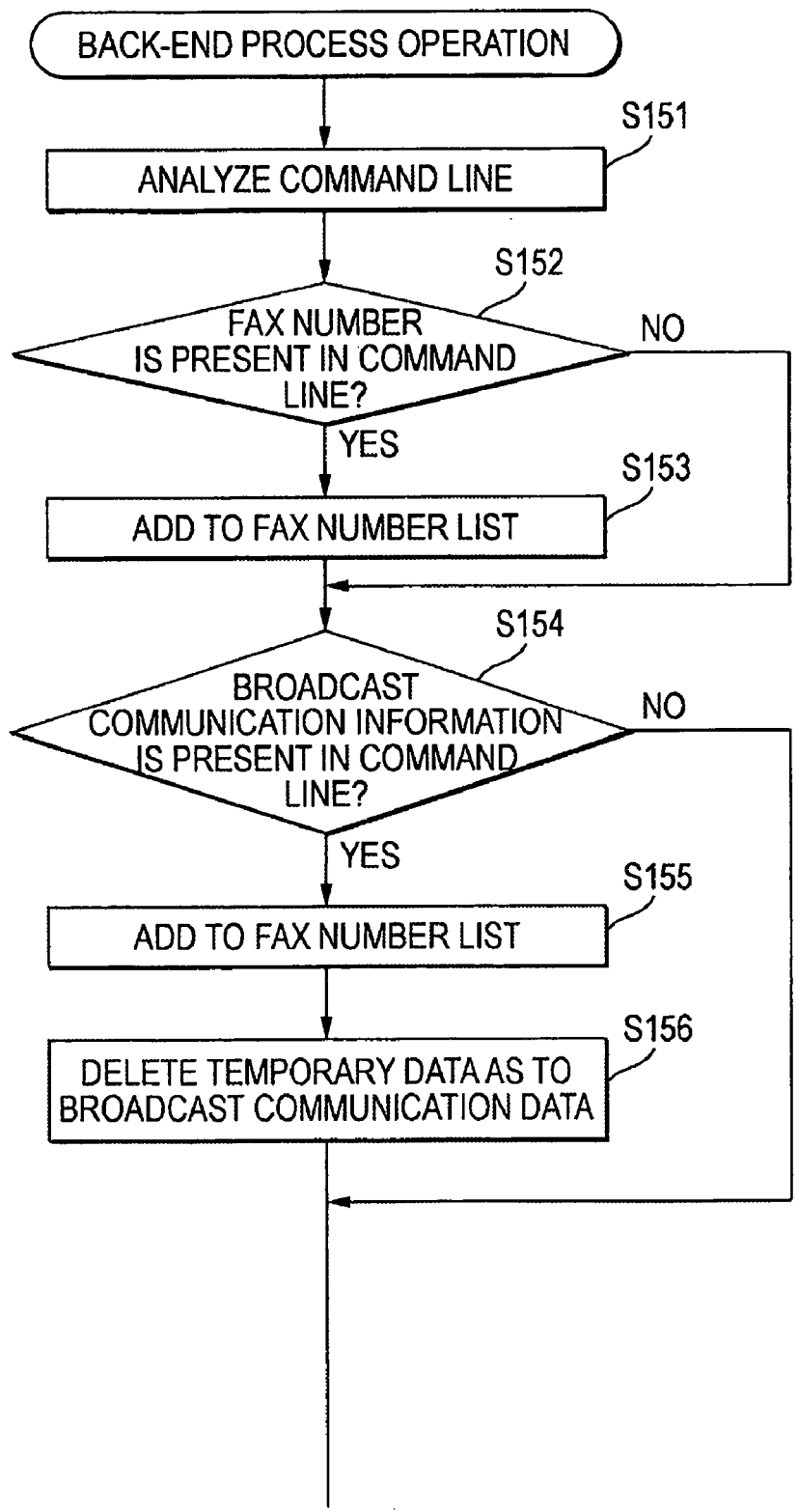
FIG. 11 is a flow chart showing a back-end process operation.

Referring now to FIG. 10, a description will be made of the process operations when the acquired input data corresponds to the OK key 14d. FIG. 10 is a flow chart for illustrating the process operation which is executed when the OK key 14d is operated. First, the CPU 2 determines as to whether the radio button 14b is set to a multicast communication or not (S141). When the radio button 14b is not set to the multicast communication (S141: No), the facsimile number of the transmission destination is displayed in the transmission destination display window 14a, so that an optional command character string for indicating that a subsequent character string is a facsimile number (e.g., "FAXNUMBER=") is produced (S142).

When the radio button 14b is set to be multicast communication (S141: Yes), a file name describing transmission destinations for the multicast communication is displayed in the transmission destination display window 14a. Accordingly, an optional command character string for indicating that a subsequent character string is a facsimile number (e.g., "NUMBERLIST=") is produced (S143), and multicast communication data described in the file with the file name shown in the transmission destination display window 14a is copied into a temporary area provided in the RAM 3 (S144).

As a result, transmission information to be transmitted is stored in the SPOOL file, so that even if the multicast communication data file is rewritten during the storing operation, data when transmission was instructed is saved in the temporary area. Therefore, since the transmission destination is set by referring to the multicast communication list stored in the temporary area after the SPOOL process, it is possible to avoid that the transmission information is transmitted to a wrong transmission destination.

When the process operation of S142 or the process operation of S144 is ended, the character string displayed in the transmission destination display window 14a is added to the optional character string (S145), the optional character string is added to the LPR command (S146), and the PPD 6c is copied into the temporary area in the RAM 3 (S147). Further, the optional character string is produced based on the file name of the PPD 6c, and added to the LPR command (S148) after which the front-end process operation is terminated.

The following is the reason for copying the PPD 6c. While the transmission destination and the specifications of a transmission image are set by referring to the PPD 6c after the SPOOL process operation, if the PPD 6c is changed during the setting operation, the transmission destination and the specifications of the transmission image are different from each other. Therefore, a copy of the PPD 6c is formed and transmission data is produced based on the transmission destination and the specifications of the transmission image described in the copied PPD 6c.

Next, aback-end process operation will be described with reference to FIG. 11. FIG. 11 is a flow chart for illustrating the back-end process operation. In the back-end process operation, first, the CPU 2 analyzes an option in the command line of the LPR command (S151), and determines as to whether the facsimile number of the transmission destination as an option is added to the command line or not (S152).

When the facsimile number of the transmission destination as an option is added to the command line (S152: Yes), the facsimile number is stored in the FAX number list (S153). The FAX number list is a transmission destination list to be stored in, for example, the temporary area in the RAM 3.

When the facsimile number of the transmission destination as an option is not added to the command line (S152: No) or the process operation of S53 is terminated, the CPU 2 then determines as to whether the name of the multicast communication file is added as an option to the command line or not (S154). When the name of the multicast communication file is added to the command line as an option (S154: Yes), the facsimile number stored in the multicast communication list stored in the temporary area is stored in the FAX number list (S155). Even when the multicast communication list is rewritten during the SPOOL process, therefore, the multicast communication list copied into the temporary area is not rewritten, so that a correct transmission destination can be stored in the FAX number list.

Next, the multicast communication list stored in the temporary area is deleted (S156). The deletion erases unnecessary files thereafter from the memory, thus ensuring efficient use of the memory.

When the name of the multicast communication file is not added as an option to the command line in the decision process operation of S54 (S154: No), or when the process operation of S56 is terminated, the CPU 2 determines as to whether the FAX number list stored in the temporary area is empty or not (S157).

When the FAX number list stored in the temporary area is empty (S157: Yes), the CPU 2 determines as to whether the copied PPD 6c is designated as an option into the command line or not (S158). When the PPD 6c is copied in S147 of the front-end process operation, the copied PPD 6c as an option is designated in the command line in S148. When facsimile transmission is commanded in the command line without using the front-end process operation, a copy is not formed.

When the copied PPD 6c is designated as an option (S158: Yes), information is acquired from the copied PPD 6c (S159), and the copied PPD 6c is deleted (S160).

On the other hand, when the copied PPD 6c is not designated as an option in the command line (S158: No), information is acquired from the PPD 6c registered in the CUPS 6b (S161). When the process operation of S160 or S161 is terminated, the facsimile number of the transmission destination acquired from the copied PPD 6c or the PPD 6c registered in the CUPS 6b is added to the FAX number list (S162) When the FAX number list stored in the temporary area is not empty (S157: No), or when the process operation of S162 is terminated, the CPU 2 produces header information for describing the facsimile number of the transmission destination stored in the FAX number list (S163), and then rasterizes transmission data in the PostScript form, read from the SPOOL file, with the resolution set by the PPD 6c, or the like (S164). For example, rasterization is executed with the resolution of, for example, 200×100 dpi when high resolution is designated, and with the resolution of, for example, 100 ×100 dpi when the normal resolution is designated.

Further, the CPU 2 encodes the transmission data to transmission data of TIFF (Tagged Image File Format) which can be transmitted via a facsimile machine (S165), and transmits the header-information added transmission data to the facsimile apparatus 11 (S166).

As described above based on the aspect, when transmission is instructed at the time of performing facsimile transmission with a multicast communication list designated, transmission data is temporarily set in a standby state by a SPOOL process operation, and after the SPOOL process operation is terminated, a transmission destination is set by referring to the multicast communication list. When the multicast communication list is rewritten in the standby state, the transmission data is transmitted to a transmission destination which is different from the intended transmission destination. When transmission is instructed, therefore, the multicast communication list is copied into the temporary area, and after the SPOOL process operation is terminated, a transmission destination is set by referring to the multicast communication list copied in the temporary area. Accordingly, it is it possible to prevent rewriting of the multicast communication list during the SPOOL process operation and set the correct transmission destination.

The process operation of S122 in the flow chart in FIG. 9 and the process operation of S143 in the flow chart in FIG. 10 correspond to a multicast communication list designating step. The process of S144 in the flow chart in FIG. 10 corresponds to a storage step. The processes operation of S163 to S165 in the flowchart in FIG. 11 correspond to a transmission data forming step. The process operation of S166 in the flow chart in FIG. 11 corresponds to a transmission step. The process operation of S156 in the flow chart in FIG. 11 corresponds to a file deleting step.

Although the aspect of the invention has been described above, the invention is not limited to the aspect, and it should be apparent to those skilled in the art that the invention may be modified and altered in various forms without departing from the spirit or scope of the invention.

For example, the foregoing description of the aspect has been made of such a case that the facsimile numbers of the plurality of transmission destinations stored in the multicast communication list are described in the header of the image information to be transmitted and are sent to the facsimile apparatus 11. However, such facsimile numbers may be alternatively sent as a separate file from the image information.

What is claimed is:

1. A non-transitory computer readable storage medium storing a program to be installed and executed in an image processing apparatus having an operating system including a CUPS (Common UNIX Printing System), the image processing apparatus including a displaying unit configured to display a setting screen for setting facsimile parameters for a facsimile transmission, the facsimile parameters being stored in a file, an updating unit configured to update the facsimile parameters based on selections corresponding to the facsimile parameters displayed in the setting screen and a storing unit configured to store a plurality of image information to be transmitted by a facsimile apparatus, the display unit, the updating unit, and the storage unit being controlled by the CUPS, the program comprising instructions of:
    writing a transmission destination into the facsimile parameters before the displaying unit displays the setting screen, the transmission destination including a facsimile number, wherein the displaying unit displays the setting screen for setting the facsimile parameters in which the written transmission destination is reflected;
    reading the facsimile parameters updated by the updating unit and the facsimile number;
    forming transmission data based upon the facsimile parameters by converting the image information, which is read out from the storing unit, into an image representation in accordance with the facsimile parameters; and
    transmitting the transmission data to the facsimile apparatus, wherein the writing is performed as a front end process,
    wherein the reading, forming, and transmitting are performed as a back end process,
    wherein a spooling process of storing the plurality of image information into the storing unit is performed between the front end process and the back end process, and
    wherein the forming step prohibits overwriting the facsimile parameters including the transmission destination and a designated mode of the image to be transmitted until the transmission destination described in the facsimile transmission is added to the image information and the transmission data is formed based upon the designated mode of the image from the facsimile parameters.

2. The medium according to claim 1,
    wherein the image processing apparatus includes a temporary storage unit configured to store the facsimile parameters updated by the updating unit, the facsimile parameters including both the transmission destination and a designation of a mode of the image to be transmitted,
    wherein the forming step adds the transmission destination stored in the temporary storage unit to the image information and forms the transmission data based upon the designation of the mode of the image stored in the temporary storage unit.

3. The medium according to claim 1, wherein the forming step adds to the image information a plurality of transmission destinations based upon a multicast communication list stored in a multicast communication list storage unit of the image processing apparatus.

4. The medium according to claim 1, wherein the forming step produces header information for describing a facsimile number of the transmission destination information and adds the header information to the image information processed in accordance with the mode indicated by the facsimile parameters.

5. The medium according to claim 1, wherein the reading step, the forming step, and the transmitting step are executed as a back-end process which carries out image processing operations using the CUPS (Common UNIX Printing System).

6. A non-transitory computer readable storage medium storing a program to be installed and executed in an image processing apparatus having an operating system including a CUPS (Common UNIX Printing System), the image processing apparatus including a storing unit configured to store a plurality of image information to be transmitted to a facsimile apparatus, the storing unit being controlled by the CUPS, the program comprising instructions of:
    designating a multicast communication list capable of storing a plurality of transmission destinations in correspondence with the image information to be transmitted, the multicast communication list being a file;
    instructing the facsimile apparatus to transmit the image information;
    prohibiting a rewriting operation of the designated multicast communication list if the facsimile apparatus is instructed to transmit the image information;
    setting a transmission destination stored in the multicast communication list, which is prohibited from being rewritten, by designating the transmission destination;
    adding a facsimile number of the transmission destination set to the image information so as to form transmission data by reading out from the file specified by the file information set at the setting step and adding the facsimile number to the image information; and
    transmitting the formed transmission data to the facsimile apparatus,
    wherein the designating step, the instructing step, and the prohibiting step are part of a front end process, and
    wherein the setting step, the adding step and the transmitting step are performed as a back end process, and
    wherein the prohibiting step prohibits the rewriting operation until the designating step and the setting step are completed.

7. The medium according to claim 6, wherein the program further comprises an instruction of releasing the rewriting operation prohibition of the multicast communication list after the transmission destination is set by the setting step.

8. The medium according to claim 6, wherein the prohibiting step displays a message that the rewriting operation of the multicast communication list is prohibited when the rewriting operation of the multicast communication list is prohibited.

9. The medium according to claim 6, wherein the prohibiting step prohibits initiation of the program which rewrites the multicast communication list when an operation of rewriting the multicast communication list is performed.

10. The medium according to claim 6, wherein the prohibiting step prevents rewriting of a memory where the multicast communication list is stored when an operation of rewriting the multicast communication list is performed.

11. The medium according to claim 6, wherein the prohibiting step includes designating exclusive writing of a file where the designated multicast communication list is stored.

12. The medium according to claim 6, wherein the prohibiting step stops a program to rewrite the multicast communication list from being initiated.

13. A non-transitory computer readable storage medium storing a program to be installed and executed in an image processing apparatus having an operating system including a CUPS (Common UNIX Printing System), the image processing apparatus including a storing unit configured to store a plurality of image information to be transmitted to a facsimile apparatus, the storing unit being controlled by the CUPS, the program comprising instructions of:

designating a multicast communication list capable of storing a plurality of transmission destinations and capable of rewriting the transmission destinations, the multicast communication list being a file;

copying the multicast communication list designated by the multicast communication list designating step as a file which is different from the multicast communication list;

setting a transmission destination stored in the copied multicast communication list by designating the transmission destination;

deleting the copied multicast communication list after the setting step;

after the deleting step, adding a facsimile number of the transmission destination stored in the file copied in the copying step to the image information so as to form transmission data by reading out from the file specified by the file information set at the setting step and adding the facsimile number to the image information; and transmitting the formed transmission data to the facsimile apparatus, wherein the designating step and the copying step are part of a front end process, and wherein the adding step, the setting step and the transmitting step are performed as a back end process, and wherein a spooling process of storing the plurality of image information into the storing unit is performed between the front end process and the back end process.

* * * * *